(12) United States Patent
Yamanouchi et al.

(10) Patent No.: US 11,934,746 B2
(45) Date of Patent: Mar. 19, 2024

(54) INFORMATION GENERATION DEVICE (71) Applicant: IHI CORPORATION, Tokyo (JP)

(72) Inventors: Yoshihisa Yamanouchi, Tokyo (JP); Yosuke Seto, Tokyo (JP); Minori Orita, Tokyo (JP); Hiroki Saito, Tokyo (JP); Takeharu Kato, Nagoya-shi (JP)

(73) Assignee: IHI CORPORATION, Tokyo (JP)

( * ) Notice: Subject to any disclaimer, the term of this patent is extended or adjusted under 35 U.S.C. 154(b) by 233 days.

(21) Appl. No.: 16/756,560

(22) PCT Filed: Oct. 16, 2018

(86) PCT No.: PCT/JP2018/038515
§ 371 (c)(1),
(2) Date: Apr. 16, 2020

(87) PCT Pub. No.: WO2019/082742
PCT Pub. Date: May 2, 2019

(65) Prior Publication Data
US 2020/0242287 A1 Jul. 30, 2020

(30) Foreign Application Priority Data
Oct. 25, 2017 (JP) ................................. 2017-206008

(51) Int. Cl.
*G06F 30/20* (2020.01)
*G08G 1/04* (2006.01)
(52) U.S. Cl.
CPC .............. *G06F 30/20* (2020.01); *G08G 1/04* (2013.01)
(58) Field of Classification Search
CPC .......... G06F 30/20; G06F 30/13; G06F 30/15; G06F 30/28; G06F 2111/10; G08G 1/04;
(Continued)

(56) References Cited

U.S. PATENT DOCUMENTS 9,286,797 B1 3/2016 Blandin et al.
2010/0250060 A1 9/2010 Maeda et al.
(Continued)

FOREIGN PATENT DOCUMENTS

CN 101809629 A 8/2010
CN 105957345 A 9/2016
(Continued)

OTHER PUBLICATIONS

Ibayashi, Pedestrian Collision Detection Device, Aug. 2016, Denso Corporation, pp. 1-17 (Year: 2016).*
(Continued)

*Primary Examiner* — Boris Gorney
*Assistant Examiner* — Bernard E Cothran
(74) *Attorney, Agent, or Firm* — Volpe Koenig (57) ABSTRACT

An information generation device generating a test case being a simulation model for reproducing a road traffic condition in an area on a road including a target point, the information generation device including: a first storage unit that stores moving-object information being information regarding a moving object existing in the area; a determination unit that determines whether or not an incident in which the moving object existing in the area shows a behavior that leads to occurrence of an accident has occurred, on the basis of the moving-object information; an extraction unit that extracts, as target information, moving-object information in a target period being a predetermined time period including a time point at which the incident occurred; and a generation unit that generates the test case upon occurrence of the incident on the basis of the target information.

5 Claims, 5 Drawing Sheets

(58) Field of Classification Search
CPC .... G08G 1/0129; G08G 1/0141; G08G 1/164; G08G 1/205; G08G 1/0116
See application file for complete search history.

(56) References Cited

U.S. PATENT DOCUMENTS

| | | | |
|---|---|---|---|
| 2013/0177207 A1* | 7/2013 | Yokota | G06V 20/58 382/103 |
| 2015/0029308 A1 | 1/2015 | Han et al. | |
| 2016/0282127 A1 | 9/2016 | Goto et al. | |
| 2017/0053461 A1* | 2/2017 | Pal | H04W 4/027 |

FOREIGN PATENT DOCUMENTS

| | | | |
|---|---|---|---|
| CN | 106408940 A | | 2/2017 |
| CN | 106710209 A | | 5/2017 |
| JP | 2002-083394 A | | 3/2002 |
| JP | 2002-260192 A | | 9/2002 |
| JP | 2002-269694 A | | 9/2002 |
| JP | 2003-203289 A | | 7/2003 |
| JP | 2004-295354 A | | 10/2004 |
| JP | 2007-315800 A | | 12/2007 |
| JP | 2008-234414 A | | 10/2008 |
| JP | 2010-211613 A | | 9/2010 |
| JP | 2011-138432 A | | 7/2011 |
| JP | 2011-186727 A | | 9/2011 |
| JP | 2012-128734 A | | 7/2012 |
| JP | 2015-090679 A | | 5/2015 |
| JP | 2016150595 A | * | 8/2016 |
| JP | 2016-180980 A | | 10/2016 |
| JP | 2016-181239 A | | 10/2016 |

OTHER PUBLICATIONS

De Gelder et al, "Assessment of Automated Driving Systems using real-life scenarios", 2017 IEEE Intelligent Vehicles Symposium (IV), IEEE, Jun. 11, 2017, p. 589-p. 594, XP033133768.

Putz et al, "System validation of highly automated vehicles with a database of relevant traffic scenarios", Retrieved from the Internet: URL:https://www.pegasusprojekt.de/files/tmpl/pdf/12th%20ITS%20European%20Congress_Folien.pdf [retrieved on Jun. 17, 2021], Jun. 22, 2017, XP055814987.

* cited by examiner

INFORMATION GENERATION DEVICE

TECHNICAL FIELD

The present disclosure relates to an information generation device.

BACKGROUND ART

In recent years, development of autonomous driving technology has been promoted. Development of autonomous driving technology requires test cases obtained by modeling use cases regarding various road traffic conditions. Conventionally, on the basis of accident investigation results conducted by Institute for Traffic Accident Research and Data Analysis (ITARDA), and the like, a test case is generated by estimating behavior of related parties (vehicles, pedestrians, and the like) leading to an accident.

CITATION LIST

Patent Literature

Patent Literature 1: Japanese Unexamined Patent Publication No. 2002-83394

SUMMARY OF INVENTION

Technical Problem

In generation of a conventional test case, since behavior of a vehicle and the like is estimated from accident investigation results, actual environment cannot be sufficiently reproduced. In addition, since a case that did not lead to an accident is not recorded, a test case for such a case cannot be generated. Furthermore, as described in Patent Literature 1, even though whether or not an unexpected event such as a traffic accident and a landslide has occurred is determined on the basis of a detection signal of a sensor installed on a road, a test case that reproduces the unexpected incident has not been generated.

The present disclosure describes an information generation device that can provide a test case of a road traffic condition that reproduces actual environment.

Solution to Problem

An information generation device according to an aspect of the present disclosure is a device that generates a test case being a simulation model for reproducing a road traffic condition in an area on a road including a target point. This information generation device includes a first storage unit configured to store a plurality of pieces of moving-object information being information regarding a moving object existing in the area detected by a sensor provided on a roadside, a determination unit configured to determine whether or not an incident in which the moving object existing in the area shows a behavior that leads to occurrence of an accident has occurred, on the basis of the plurality of pieces of moving-object information, an extraction unit that extracts, as target information, moving-object information in a target period being a predetermined time period including a time point at which the incident occurred, from the plurality of pieces of moving-object information, and a generation unit that generates the test case upon occurrence of the incident on the basis of the target information.

Effects of Invention

According to the present disclosure, it is possible to provide a test case of a road traffic condition that reproduces actual environment.

DESCRIPTION OF EMBODIMENTS

[1] Overview of Embodiment

An information generation device according to an aspect of the present disclosure is a device that generates a test case being a simulation model for reproducing a road traffic condition in an area on a road including a target point. This information generation device includes a first storage unit configured to store a plurality of pieces of moving-object information being information regarding a moving object existing in the area detected by a sensor provided on a roadside, a determination unit configured to determine whether or not an incident in which the moving object existing in the area shows a behavior that leads to occurrence of an accident has occurred, on the basis of the plurality of pieces of moving-object information, an extraction unit that extracts, as target information, moving-object information in a target period being a predetermined time period including a time point at which the incident occurred, from the plurality of pieces of moving-object information, and a generation unit that generates the test case upon occurrence of the incident on the basis of the target information.

In this information generation device, it is determined whether or not an incident in which a moving object on a road shows behavior leading to occurrence of an accident has occurred, on the basis of moving-object information, detected by a sensor provided on a roadside, regarding the moving object, and a test case for reproducing the road traffic condition upon occurrence of the incident is generated. Since the test case is generated on the basis of moving-object information in a predetermined target period including the time point at which the incident occurred, the reproducibility of the actual road traffic condition upon occurrence of the incident can be improved. As a result, it is possible to provide a test case of the road traffic condition that reproduces the actual environment.

Each of the plurality of pieces of moving-object information may include type information indicating the type of the moving object and position information indicating the position of the moving object. Depending on the type of the moving object, the criterion for determining whether or not an incident has occurred may be different. Therefore, by using the type and position of the moving object, it is possible to improve the accuracy of determining whether or not an incident has occurred.

The information generation device may further include a second storage unit that stores a plurality of pieces of weather information. Each of the plurality of pieces of weather information may be information on weather in the area. The extraction unit may further extract weather information in a target period as target information, from the plurality of pieces of weather information. In this case, since a test case can be generated in consideration of the influence of weather upon occurrence of an incident, it is possible to further improve the reproducibility of the actual road traffic condition.

The sensor may be a laser radar. Since the detection accuracy of the laser radar is higher than the detection accuracy of a camera, a millimeter-wave radar, and the like, it is possible to further improve the reproducibility of the actual road traffic condition upon occurrence of an incident.

[2] Example of Embodiment

Hereinafter, an embodiment of the present disclosure will be described with reference to the drawings. It should be noted that in the description of the drawings, identical elements are denoted by identical reference signs, and overlapping descriptions are omitted.

Figure 1:
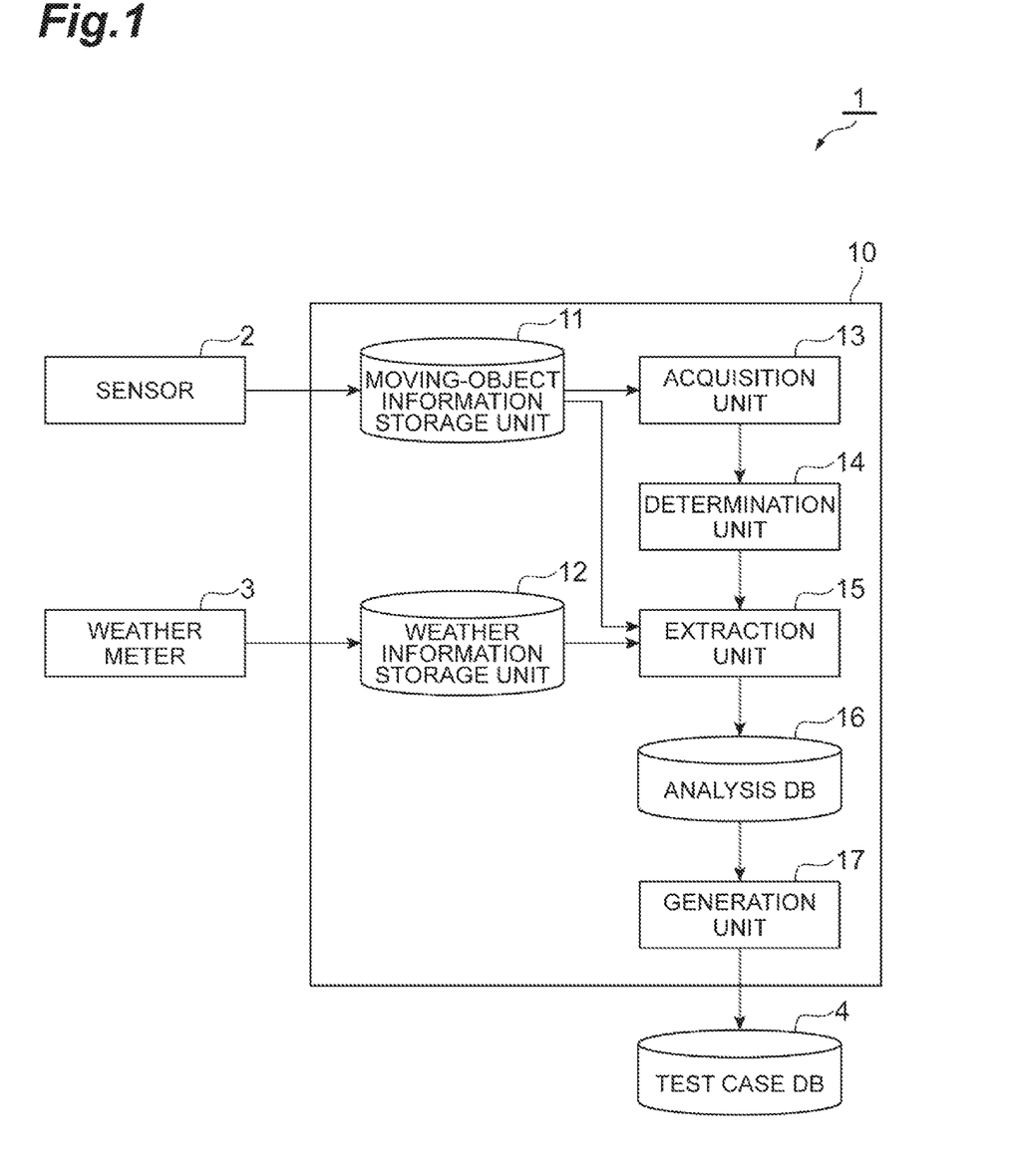
FIG. 1 is a functional block diagram of an information generation system including an information generation device according to one embodiment.
Figure 2:
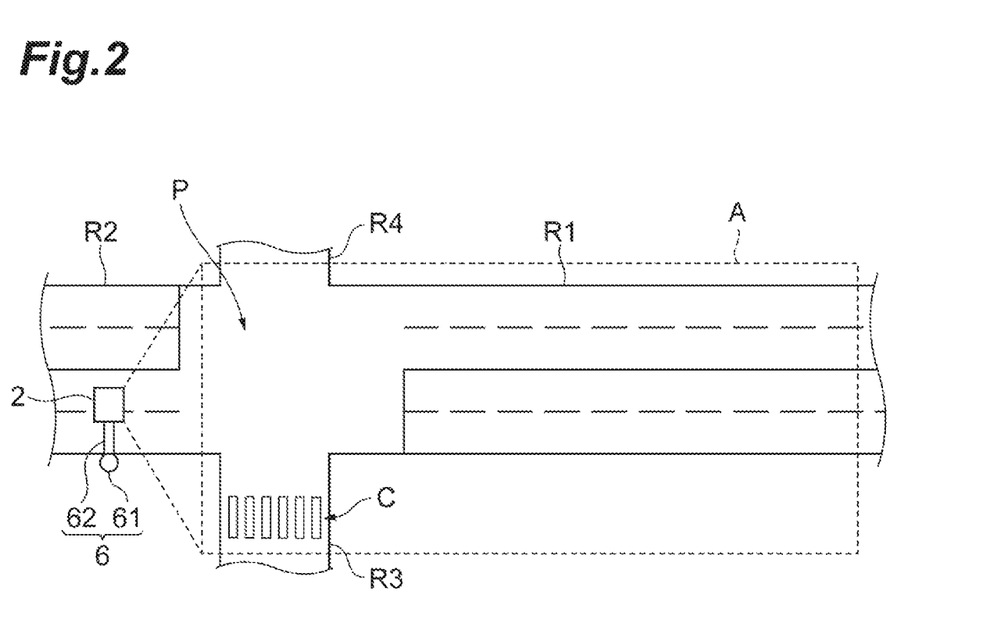
FIG. 2 is a diagram illustrating an example of an area including a target point.

FIG. 1 is a functional block diagram of an information generation system including an information generation device according to one embodiment. FIG. 2 is a diagram illustrating an example of an area including a target point. An information generation system 1 illustrated in FIG. 1 is a system that generates a test case. A test case is a simulation model for reproducing a road traffic condition in a target area A (see FIG. 2) on a road. The area A is an area on a road which is a target for reproduction and is a predetermined range including a target point. Examples of the target point include points where an accident is likely to occur, such as an intersection, a T-junction, and a junction. The test case is used for a simulator such as a Hardware-in-the-loop simulator (HILS). The information generation system 1 includes a sensor 2, a weather meter 3, a test case DB 4, and an information generation device 10.

The sensor 2 is a device that senses (detects) a moving object existing in the area A in real time. The sensor 2 is a laser radar (LiDAR). As the sensor 2, a millimeter-wave radar, a camera, or the like may be used, or a combination of a plurality of types of sensors may be used. The sensor 2 detects the position of a moving object included in the area A and the type of the moving object. Examples of the moving object to be detected include a vehicle, a pedestrian, and a two-wheeler. Since a method for detecting the position and type of a moving object is known, detailed description thereof is omitted here. The sensor 2 generates moving-object information regarding a moving object and transmits the moving-object information to the information generation device 10. The sensor 2 transmits moving-object information to the information generation device 10 via, for example, a wireless device (not illustrated) provided on a columnar structure 6.

The moving-object information is information regarding a moving object existing in the area A detected by the sensor 2. The moving-object information includes time information indicating the measured time, a place identifier (ID) capable of uniquely identifying the place, a moving-object ID capable of uniquely identifying a moving object, type information indicating the type of the moving object, and position information indicating the position of the moving object. The moving-object information may further include at least one of size information indicating the size of the moving object, speed information indicating the speed of the moving object, acceleration information indicating acceleration of the moving object, and traveling direction information indicating the traveling direction of the moving object. Examples of the type of a moving object include a vehicle, a pedestrian, and a two-wheeler. The position of the moving object may be represented by, for example, XY coordinates with the center of an intersection set to the origin. The size of a moving object is represented by, for example, length, width, and height. The sensor 2 generates moving-object information at predetermined time intervals.

As illustrated in FIG. 2, the sensor 2 is provided on a roadside near an intersection P which is a target point. Specifically, the sensor 2 is installed on the columnar structure 6 provided on the roadside. The columnar structure 6 includes, for example, a support column 61 and an arm 62. The support column 61 is erected on the roadside. The arm 62 extends from the upper end of the support column 61 in a direction crossing the road. The area A includes the intersection P, a road R1, and a crosswalk C. The road R1 extends from the intersection P in a direction opposite to the position where the sensor 2 is provided. The crosswalk C is a crosswalk in the right-turn direction as viewed from the sensor 2. In order to acquire moving-object information of moving bodies on roads R1 to R4 extending in four directions from the intersection P, a sensor 2 may be provided on the roadside of each road.

It should be noted that as illustrated in FIG. 2, in a case where the target point is an intersection, the sensor 2 detects as a moving object, a right-turn vehicle, an oncoming vehicle of the right-turn vehicle, and a pedestrian (bicycle) located ahead of the right-turn vehicle after the vehicle makes a right turn. However, detection target of the sensor 2 is not limited to them. The sensor 2 detects all moving bodies in the area A such as a left-turn vehicle, a pedestrian (bicycle) located ahead of the left-turn vehicle after the vehicle makes a left turn, and a vehicle going straight ahead. The sensing area of the sensor 2 only needs to include the area A, and may be wider than the area A.

The weather meter 3 is a device for observing the weather in the area A in real time. The weather meter 3 is provided on the roadside near the target point. The weather meter 3 is installed on the columnar structure 6 together with the sensor 2, for example. The weather meter 3 measures, for example, temperature, humidity, atmospheric pressure, rainfall, wind speed, wind direction, and solar radiation. The weather meter 3 generates weather information and transmits the weather information to the information generation device 10. The weather meter 3 transmits the weather information to the information generation device 10 via a wireless device (not illustrated) provided on the columnar structure 6, for example. The weather information is information regarding weather in the area A. The weather information includes time information indicating a time at which the measurement was performed, a place ID capable of uniquely identifying a place, and a measured value. The weather meter 3 generates weather information at predetermined time intervals.

The test case DB 4 stores test cases generated by the information generation device 10. The test cases stored in the test case DB 4 can be used, for example, by a user who has access authority. The test cases can be used for development of an advanced driver assistance system and an automatic driving system.

The information generation device 10 is a device that generates a test case. The information generation device 10 generates a test case on the basis of moving-object information and weather information. The information generation device 10 transmits the generated test case to the test case DB 4. The information generation device 10 is configured of, for example, an information processing device such as a computer.

Figure 3:
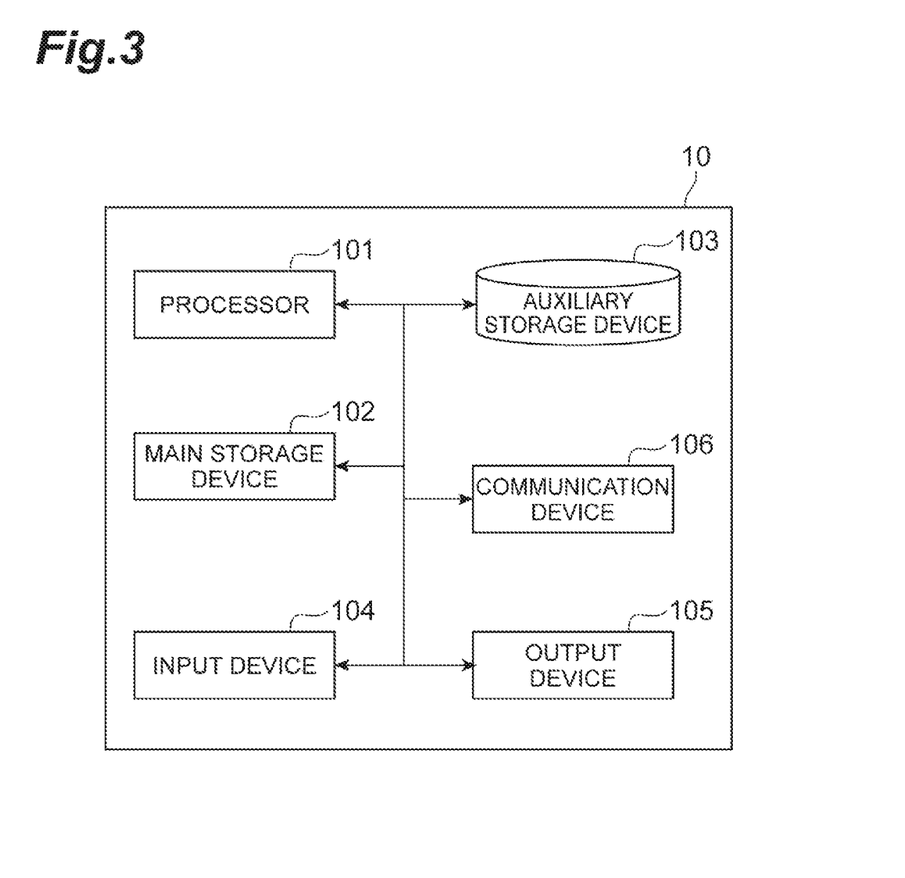
FIG. 3 is a hardware configuration diagram of the information generation device.

FIG. 3 is a hardware configuration diagram of the information generation device. As illustrated in FIG. 3, the information generation device 10 can be physically configured as a computer that includes hardware such as one or a plurality of processors 101, a main storage device 102 such as a random access memory (RAM) and a read only memory (ROM), an auxiliary storage device 103 such as a hard disk device, an input device 104 such as a keyboard, an output device 105 such as a display, and a communication device 106 which is a data transmission/reception device. Each function illustrated in FIG. 1 of the information generation device 10 is realized by loading one or a plurality of predetermined computer programs into hardware such as the main storage device 102 to operate each piece of hardware under control of one or the plurality of processors 101 and reading and writing data from and to memories such as the main storage device 102 and the auxiliary storage device 103.

The information generation device 10 functionally includes a moving-object information storage unit 11 (first storage unit), a weather information storage unit 12 (second storage unit), an acquisition unit 13, a determination unit 14, an extraction unit 15, an analysis DB 16, and a generation unit 17.

The moving-object information storage unit 11 is a unit that stores a plurality of pieces of moving-object information. The moving-object information storage unit 11 adds received moving-object information every time moving-object information is received from the sensor 2. The weather information storage unit 12 is a unit that stores a plurality of pieces of weather information. The weather information storage unit 12 adds received weather information every time weather information is received from the weather meter 3.

The acquisition unit 13 is a unit that acquires moving-object information stored in the moving-object information storage unit 11. The acquisition unit 13 acquires, for example, moving-object information for a specified period. The acquisition unit 13 outputs acquired moving-object information to the determination unit 14.

The determination unit 14 is a unit that determines whether or not an incident has occurred on the basis of a plurality of pieces of moving-object information acquired by the acquisition unit 13. An incident is an event indicating a behavior (a behavior that induces an accident) in which a moving object existing in the area A leads to occurrence of an accident. Behavior that leads to occurrence of an accident is a dangerous behavior associated with an accident, and is a behavior that causes an accident with a certain or higher possibility. In a case where the moving object is a vehicle, examples of the behavior that leads to an accident include sudden acceleration/deceleration, speeding, sudden lane change, and abnormal approach to another vehicle. In a case where the moving object is a pedestrian, examples of the behavior that leads to occurrence of an accident include sudden entering into a road and sudden stop.

The determination unit 14 determines the presence or absence of sudden acceleration/deceleration by comparing the acceleration/deceleration of the moving object with an acceleration/deceleration threshold (acceleration/deceleration threshold). Specifically, in a case where the absolute value of acceleration of the moving object (that is, acceleration or deceleration) exceeds the acceleration/deceleration threshold, the determination unit 14 determines that the moving object suddenly accelerates/decelerates (that is, an incident has occurred). In a case where the absolute value of acceleration of the moving object is equal to or smaller than the acceleration/deceleration threshold, the determination unit 14 determines that the moving object does not suddenly accelerate/decelerate (that is, an incident has not occurred).

The determination unit 14 determines whether or not the speed exceeds the speed limit by comparing speed of the moving object with a speed threshold (speed threshold). Specifically, in a case where the speed of the moving object exceeds the speed threshold, the determination unit 14 determines that the moving object exceeds the speed limit (that is, an incident has occurred). In a case where the speed of the moving object is equal to or small than the speed threshold, the determination unit 14 determines that the moving object does not exceed the speed limit (that is, an incident has not occurred).

The determination unit 14 determines presence or absence of abnormal approach by comparing the distance between moving bodies with a threshold (distance threshold) of the following distance. Specifically, in a case where the distance between moving bodies is less than the distance threshold, the determination unit 14 determines that the two moving bodies approach abnormally (that is, an incident has occurred). In a case where the distance between moving bodies is equal to or greater than the distance threshold, the determination unit 14 determines that the two moving bodies do not approach abnormally (that is, an incident has not occurred).

The determination unit 14 determines whether or not the moving object has suddenly stopped on the road on the basis of acceleration and the position of the moving object. The determination unit 14 determines whether or not there is a sudden lane change and a sudden entering, on the basis of a change in the position of the moving object. In a case of assuming that the moving bodies existing in the area A maintain the current conditions (relative speed), the determination unit 14 may calculate time to collision (TTC), which is the time until the moving bodies collide with each other (or approach to the extent that the moving bodies are likely to collide) and may compare the time to collision with a TTC threshold to determine whether or not an incident has occurred.

When the determination unit 14 determines that any of the incidents has occurred, the determination unit 14 outputs time at which the incident occurred to the extraction unit 15.

The extraction unit 15 is a unit that extracts, from a plurality of pieces of moving-object information stored in the moving-object information storage unit 11, moving-object information in a target period as target information. The target period is a predetermined time period including the occurrence time point (occurrence time) of the incident. The target period is, for example, about several tens of seconds before and after the occurrence time of the incident. In a case where a traffic light is provided at a target point, the target period may be a period of several cycles of the traffic light. One cycle of the traffic light is a period from when the traffic light allows traffic to proceed (green) to when the traffic light allows traffic to proceed next time. The extraction unit 15 further extracts weather information in the target period as target information from a plurality of pieces of weather information stored in the weather information storage unit 12. The extraction unit 15 outputs target information to the analysis DB 16. Examples of the target information include comma separated value (CSV)-format data.

The analysis DB 16 stores target information extracted by the extraction unit 15.

The generation unit 17 is a unit that generates a test case when an incident occurs on the basis of target information stored in the analysis DB 16. The test case includes an environmental model, a weather model, and a traffic flow model.

The environment model is a simulation model for reproducing the area A and the surrounding environment of the area A. The environment model includes a road environment model and a surrounding environment model. The road environment model is a simulation model for reproducing a road environment such as a lane, a lane width, a gradient, a median strip, a sidewalk, a traffic light, and a traffic sign. The surrounding environment model is a simulation model for reproducing a surrounding environment such as a building and a street tree. The environment model may be generated on the basis of moving-object information included in the target information, or may be set in advance on the basis of a site investigation or map information. The environment model reproduces the area A and the surrounding environment of the area A in two or three dimensions.

The weather model is a simulation model for reproducing the weather in the area A upon occurrence of the incident. The generation unit 17 generates the weather model on the basis of the weather information included in the target information. The weather model makes it possible to reproduce factors that affect the behavior of the onboard sensor or a vehicle, such as the temperature, humidity, atmospheric pressure, rainfall, wind speed, wind direction, and solar radiation. For example, the slippage of the road surface (wet condition of the road surface), visibility of the driver, day or night, weather, wind pressure applied to the vehicle body, and the like can be reproduced. The slippage of the road surface can be generated by calculating a friction coefficient from the type of road surface and weather information.

The traffic flow model is a simulation model for reproducing a traffic flow in the area A upon occurrence of the incident. The generation unit 17 generates the traffic flow model on the basis of moving-object information included in the target information. For example, the size, the position, the speed, the acceleration, the traveling direction, and the like of each moving object can be reproduced. The generation unit 17 transmits the generated test case to the test case DB 4.

It should be noted that the generation unit 17 may generate a test case by excluding data that is not directly related to the incident from the target information. The test case may be visualization information for visualizing a road traffic condition in the area A, and may be, for example, a three-dimensional moving image model that can be used by a simulation tool such as HILS. The format of the test case can be appropriately changed according to the request of the user of the test case DB 4. For example, the test case may be the target information itself.

Figure 4:
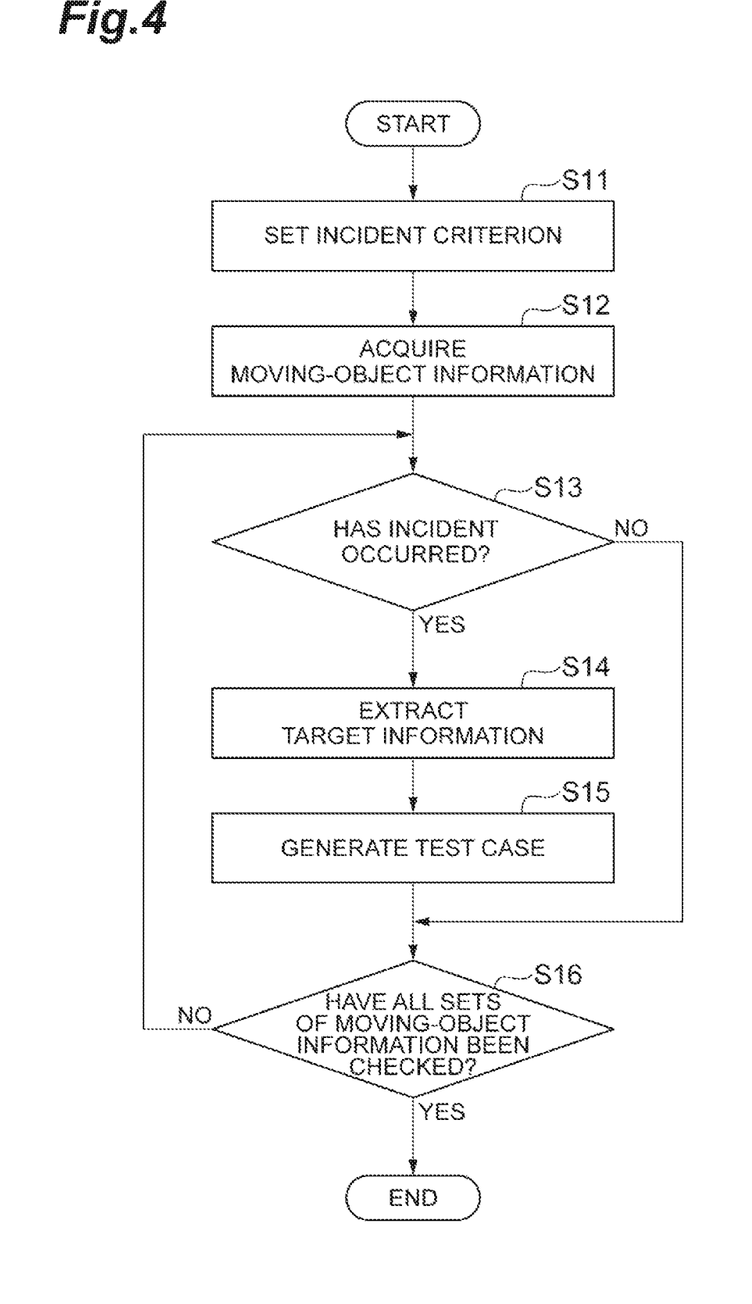
FIG. 4 is a flowchart illustrating a series of processes of an information generation method performed by the information generation device.

Next, an information generation method performed by the information generation device 10 will be described. FIG. 4 is a flowchart illustrating a series of processes of the information generation method performed by the information generation device. The series of processes illustrated in FIG. 4 are performed, for example, at fixed intervals. The series of processes illustrated in FIG. 4 may be performed at a timing when a user of the information generation device 10 instructs generation of a test case.

First, an incident criterion is specified by the user, and the determination unit 14 sets the specified incident criterion (step S11). The incident criterion is a criterion for determining whether or not an incident has occurred. The incident criterion is specified (set) for each type of the moving object. At least one of the specifiable incident criteria is specified. Examples of the incident criterion include an acceleration/deceleration threshold, a speed threshold, a distance threshold, and a TTC threshold.

Subsequently, the acquisition unit 13 acquires the moving-object information from the moving-object information storage unit 11 (step S12). Then, the acquisition unit 13 outputs the acquired moving-object information to the determination unit 14.

Subsequently, the determination unit 14 determines whether or not an incident has occurred, by using the moving-object information acquired by the acquisition unit 13 (step S13). For example, the determination unit 14 determines whether or not an incident has occurred by using moving-object information for a fixed period in chronological order from among moving-object information acquired by the acquisition unit 13. The determination unit 14 determines whether or not an incident has occurred by using the set incident criterion.

In step S13, in a case where the determination unit 14 determines that an incident has occurred (step S13: YES), the determination unit 14 outputs the time at which the incident occurred to the extraction unit 15. Then, the extraction unit 15 extracts the target information on the basis of occurrence time of the incident (step S14). Specifically, the extraction unit 15 extracts moving-object information in a target period including the occurrence time of the incident from a plurality of pieces of moving-object information stored in the moving-object information storage unit 11, and extracts weather information in the same target period from a plurality of pieces of weather information stored in the weather information storage unit 12. Then, the extraction unit 15 sets the extracted moving-object information and weather information as target information, outputs the target information to the analysis DB 16, and stores the target information in the analysis DB 16.

Subsequently, the generation unit 17 generates a test case on the basis of the target information stored in the analysis DB 16 (step S15). Specifically, the generation unit 17 generates a traffic flow model on the basis of moving-object information included in the target information. In addition, the generation unit 17 generates a weather model on the basis of the weather information included in the target information. Then, the generation unit 17 sets the generated traffic flow model and weather model together with an environment model prepared in advance as a test case, and transmits the test case to the test case DB 4. Subsequently, the determination unit 14 determines whether or not occurrence of an incident has been checked for all pieces of moving-object information (step S16).

On the other hand, in step S13, in a case where the determination unit 14 determines that the incident has not occurred (step S13: NO), the processes of step S14 and step S15 are omitted, and the process of step S16 is performed.

In step S16, in a case where the determination unit 14 determines that there is moving-object information that has not been checked (step S16: NO), the processes of steps S13 to S16 are performed again by using the moving-object information in the next fixed period. On the other hand, in step S16, in a case where the determination unit 14 determines that all the pieces of moving-object information have been checked (step S16: YES), the series of processes of the information generation method end.

Figure 5:
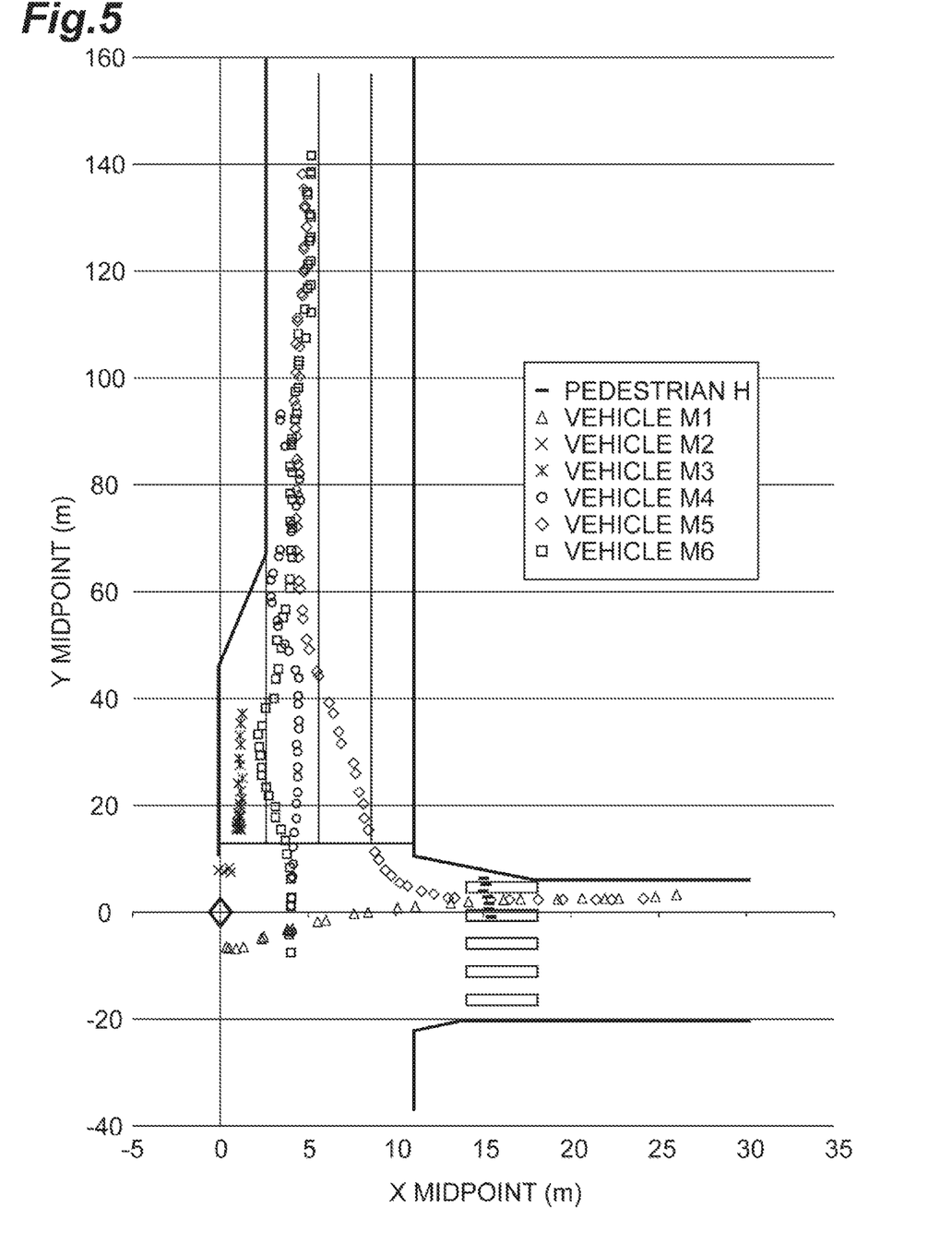
FIG. 5 is a diagram illustrating an example of a test case generated by the information generation device.

Next, an example of the test case generated by the information generation device 10 will be described. FIG. 5 is a diagram illustrating an example of a test case generated by the information generation device. In the example illustrated in FIG. 5, movement of each moving object is indicated by a plot. The target point is an intersection, and the center of the intersection is set to the origin of the XY coordinates. The X axis indicates the horizontal direction as viewed from the sensor 2, and the Y axis indicates the straight traveling direction as viewed from the sensor 2. The horizontal axis in FIG. 5 indicates the X midpoint which is the X coordinate of the midpoint (center) in the X-axis direction of a moving object, and the unit is meters (m). The vertical axis of FIG. 5 indicates the Y midpoint which is the Y coordinate of the midpoint (center) in the Y axis direction of the moving object, and the unit is meters (m).

At the start of this test case, a vehicle M1 is waiting for a right turn, and a vehicle M2 is waiting for a right turn on a right-turn-waiting lane opposite to the vehicle M1. Then, a vehicle M3 travels on the right-turn-waiting lane and stops behind the vehicle M2. Thereafter, a vehicle M4 goes straight on a go-straight lane, and from behind, a vehicle M5 turns left while changing over two lanes. Further, a vehicle M6 is about to turn from the go-straight lane to the right-turn-waiting lane. At this time, the vehicle M1 considers that the vehicle M6 will proceed to the right-turn-waiting lane and starts a right turn; however, the vehicle M6 returns to the go-straight lane and goes straight. As a result, an incident occurs in which the vehicle M1 and the vehicle M6 nearly collide with each other. Also, upon occurrence of the incident, a pedestrian H is crossing a crosswalk located ahead the right-turn spot.

As described above, according to the test case, before and after occurrence of the incident, road traffic conditions such as whether or not there is a sudden change of course, whether or not there is a pedestrian ahead a right-turn spot, and the speed of vehicles are reproduced. In addition, weather, temperature, and the like before and after occurrence of the incident are also reproduced.

As described above, in the information generation device 10, it is determined whether or not an incident has occurred on the basis of moving-object information regarding the moving object detected by the sensor 2 provided on the roadside, and a test case for reproducing the road traffic conditions in the area A upon occurrence of the incident is generated. Since the test case is generated on the basis of moving-object information in a predetermined target period including the time point at which the incident occurred, the reproducibility of the actual road traffic condition upon occurrence of the incident can be improved. As a result, it is possible to provide a test case of the road traffic condition that reproduces the actual environment.

For example, in a case where a pedestrian enters an area other than the crosswalk on the road, it can be determined that an incident has occurred. On the other hand, even if a vehicle enters the road, it is not determined that an incident has occurred. As described above, depending on the type of the moving object, the criterion for determining whether or not an incident has occurred may be different. Therefore, by using the type and position of the moving object, it is possible to improve the accuracy of determining whether or not an incident has occurred.

Since the target information includes weather information in the target period, the test case is generated further on the basis of the weather information in the target period including the time point at which the incident occured. Temperature, humidity, atmospheric pressure, rainfall, wind speed, wind direction, solar radiation, and the like can affect, for example, the behavior of an onboard sensor, the behavior of a vehicle, and the visibility of a driver. In addition, rainfall and the like may affect, for example, slipperiness of the road surface. For this reason, by using weather information to generate a test case, it is possible to generate a test case in consideration of the influence of weather upon occurrence of the incident. As a result, it is possible to further enhance the reproducibility of the actual road traffic condition.

In the autonomous driving technology, for example, in the case of traveling on the left side, reliability in a case where a vehicle makes a right turn at an intersection (left turn in the case of traveling on the right side) is required. In order to evaluate the reliability of an automatic driving system (electronic control unit: ECU) of a vehicle, a test case that reproduces the road traffic condition at an intersection, the test case being created by assuming all scenes, is required. In particular, the road traffic condition upon occurrence of an accident and the road traffic condition which did not lead to an accident but is close to an accident (so-called near-miss) are important. The information generation device 10 determines that an incident has occurred in a case where a moving object on a road indicates a behavior that leads to occurrence of an accident. For this reason, it is possible to provide a test case of a road traffic condition which did not lead to an accident but is close to an accident, in addition to a test case of the road traffic condition upon occurrence of an accident.

In the above embodiment, the sensor 2 is a laser radar. Since the detection accuracy of the laser radar is higher than the detection accuracy of a camera, a millimeter-wave radar, and the like, it is possible to further improve the reproducibility of the actual road traffic condition upon occurrence of an incident.

An embodiment of the present disclosure has been described above; however, the present invention is not limited to the above embodiment.

For example, in the above embodiment, the information generation device 10 is configured as one device, but may be configured of two or more devices.

Moving-object information detected by the sensor 2 may not include speed information and acceleration information of a moving object. In this case, the determination unit 14 may calculate the speed and acceleration of the moving object from the position information of the moving object.

The acquisition unit 13 may acquire moving-object information for a specified period in addition to the weather information in the same period. In this case, the determination unit 14 may determine whether or not an incident has occurred on the basis of a plurality of pieces of moving-object information and a plurality of pieces of weather information acquired by the acquisition unit 13.

The determination unit 14 may determine whether or not an incident has occurred by using machine learning. The determination unit 14 may determine whether or not an incident has occurred by using any of the speed information and the acceleration information of moving-object information of the moving object.

In a case where a traffic light is provided at the target point, the extraction unit 15 may further extract traffic light information in a target period as target information. The traffic light information is information indicating the status of the traffic light (allowed to proceed, stop, and caution). In this case, since a test case reproducing the condition of the traffic light upon occurrence of an incident can be generated, it is possible to further improve reproducibility of the actual road traffic condition.

The extraction unit 15 does not need to extract weather information in a target period. In this case, since the weather meter 3 and the weather information storage unit 12 can be omitted, the information generation system 1 and the information generation device 10 can be reduced in size.

REFERENCE SIGNS LIST

1 Information generation system
2 Sensor
3 Weather meter
4 Test case DB
6 Columnar structure
10 Information generation device
11 Moving-object information storage unit (First storage unit)
12 Weather information storage unit (Second storage unit)
13 Acquisition unit
14 Determination unit
15 Extraction unit
16 Analysis DB
17 Generation unit
61 Support column
62 Arm

The invention claimed is:

1. An information generation device generating a test case being a simulation model for reproducing a road traffic condition in an area on a road including a target point, the information generation device comprising:
   a memory configured to store a plurality of pieces of moving-object information being information regarding a moving object existing in the area detected by a sensor provided on a side of the road; and
   a processor configured to determine whether or not an incident where the moving object existing in the area shows a behavior leading to occurrence of an accident has occurred, configured to extract, as target information, moving-object information in a target period being a predetermined time period including a time point when the incident occurred, from the plurality of pieces of moving-object information, and configured to generate the test case upon occurrence of the incident on a basis of the target information,
   wherein each of the plurality of pieces of moving-object information includes type information indicating a type of the moving object from among types of objects having different forms of propulsion, and position information indicating a position of the moving object at a respective time point within the target period, and
   wherein the processor is configured to determine whether or not the incident has occurred on a basis of the type information and the position information by using incident criterions set for each type of the moving object, the incident criterions including exceeding an acceleration/deceleration threshold, a speed threshold, a distance threshold, and a TTC threshold for the respective type of moving object.

2. The information generation device according to claim 1 further comprising a second memory configured to store a plurality of pieces of weather information, wherein
   each of the plurality of pieces of weather information is information regarding weather in the area, and
   the processor is further configured to extract, as the target information, weather information in the target period, from the plurality of pieces of weather information.

3. The information generation device according to claim 2, wherein the sensor is a laser radar.

4. The information generation device according to claim 1, wherein the sensor is a laser radar.

5. The information generation device according to claim 1 wherein type information indicating a type of the moving object includes object types of a vehicle, a pedestrian and a two-wheeler.

* * * * *